US 10,243,362 B2

(12) United States Patent
Sharma

(10) Patent No.: US 10,243,362 B2
(45) Date of Patent: Mar. 26, 2019

(54) CONTROL SYSTEM FOR POWER TRANSMISSION WITHIN A STRUCTURE

(71) Applicant: Vikrant Sharma, Portland, OR (US)

(72) Inventor: Vikrant Sharma, Portland, OR (US)

( * ) Notice: Subject to any disclaimer, the term of this patent is extended or adjusted under 35 U.S.C. 154(b) by 335 days.

(21) Appl. No.: 15/007,766

(22) Filed: Jan. 27, 2016

(65) Prior Publication Data

US 2016/0141875 A1    May 19, 2016

Related U.S. Application Data

(63) Continuation of application No. 13/664,172, filed on Oct. 30, 2012, now Pat. No. 9,261,870.

(51) Int. Cl.
*H02J 3/14* (2006.01)
*G05B 19/02* (2006.01)
*H01H 47/22* (2006.01)
*H02J 13/00* (2006.01)

(52) U.S. Cl.
CPC ............... *H02J 3/14* (2013.01); *G05B 19/02* (2013.01); *H01H 47/22* (2013.01); *H02J 13/0075* (2013.01); *H02J 2003/143* (2013.01); *Y02B 70/3225* (2013.01); *Y02B 90/224* (2013.01); *Y04S 20/14* (2013.01); *Y04S 20/222* (2013.01)

(58) Field of Classification Search
CPC ............ H02J 3/14; G05B 19/02; H01H 47/22
USPC .................... 307/38; 340/4.34; 713/320, 324
See application file for complete search history.

(56) References Cited

U.S. PATENT DOCUMENTS

| | | |
|---|---|---|
| 3,938,068 A | 2/1976 | Hagan |
| 4,549,309 A | 10/1985 | Corrigan |
| 4,613,739 A | 9/1986 | Richards |
| 5,442,340 A | 8/1995 | Dykema |
| 5,694,115 A | 12/1997 | Desatoff |
| 5,758,100 A | 5/1998 | Odisho |
| 6,333,698 B1 | 12/2001 | Roddy |
| 6,476,523 B1 | 11/2002 | Lee |
| 7,275,970 B2 | 10/2007 | Hoshina |
| 8,478,450 B2 | 7/2013 | Lu et al. |
| 8,502,414 B2 | 8/2013 | Lee et al. |
| 8,743,686 B2 | 6/2014 | Zhou et al. |
| 8,776,136 B2 | 7/2014 | Hatanaka et al. |
| 9,261,870 B2 | 2/2016 | Sharma |
| 2003/0169157 A1 | 9/2003 | Yokoo |
| 2003/0185027 A1 | 10/2003 | Yokoo et al. |
| 2003/0209944 A1 | 11/2003 | Barton |
| 2004/0242087 A1 | 12/2004 | Hoshina |
| 2005/0093513 A1 | 5/2005 | Herbener et al. |
| 2006/0056448 A1 | 3/2006 | Zaki et al. |
| 2007/0080800 A1 | 4/2007 | Carbone et al. |
| 2007/0118831 A1* | 5/2007 | Kondo ............... E05B 47/0009 717/121 |
| 2007/0155349 A1 | 7/2007 | Nelson et al. |
| 2007/0206629 A1 | 9/2007 | Choi |

(Continued)

FOREIGN PATENT DOCUMENTS

| | | |
|---|---|---|
| CN | 1808505 A | 7/2006 |
| CN | 100440084 C | 12/2008 |

(Continued)

*Primary Examiner* — Thomas Skibinski
(74) *Attorney, Agent, or Firm* — Chernoff, Vilhauer, LLP

(57) ABSTRACT

A system of electrical distribution within a building, which selectively energizes power sockets only when an appliance is connected to the socket and in need of power.

2 Claims, 3 Drawing Sheets

(56) References Cited

U.S. PATENT DOCUMENTS

| | | |
|---|---|---|
| 2008/0114979 A1 | 5/2008 | Hsi |
| 2009/0058185 A1 | 3/2009 | Schoettle |
| 2009/0230779 A1 | 9/2009 | Ryan et al. |
| 2010/0056078 A1 | 3/2010 | Feldman et al. |
| 2010/0194539 A1 | 8/2010 | Delamare |
| 2010/0226298 A1 | 9/2010 | Chan et al. |
| 2010/0284317 A1 | 11/2010 | Chan et al. |
| 2011/0006615 A1 | 1/2011 | Kim et al. |
| 2011/0144824 A1 | 6/2011 | Campesi et al. |
| 2011/0175711 A1* | 7/2011 | Kuo ................. G06F 1/266 340/12.32 |
| 2011/0237289 A1 | 9/2011 | Fodor et al. |
| 2011/0260549 A1 | 10/2011 | Jung et al. |
| 2011/0304208 A1 | 12/2011 | Lee et al. |
| 2011/0304209 A1 | 12/2011 | Lee et al. |
| 2012/0297217 A1 | 11/2012 | Lee et al. |
| 2013/0057883 A1 | 3/2013 | Ohshima et al. |
| 2013/0119777 A1 | 5/2013 | Rees |
| 2013/0120112 A1 | 5/2013 | Zhao |
| 2013/0234534 A1 | 9/2013 | Lin |
| 2014/0111028 A1 | 4/2014 | Higgins et al. |

FOREIGN PATENT DOCUMENTS

| | | |
|---|---|---|
| EP | 119187 A1 | 9/1984 |
| EP | 1657623 A1 | 5/2006 |
| FR | 2923958 A1 | 5/2009 |
| GB | 2068614 A | 8/1981 |
| JP | 02109282 A | 4/1990 |
| JP | 08263751 A | 10/1996 |
| JP | 08265863 A | 10/1996 |
| JP | 08336777 A | 12/1996 |

\* cited by examiner

CONTROL SYSTEM FOR POWER TRANSMISSION WITHIN A STRUCTURE

CROSS-REFERENCE TO RELATED APPLICATIONS

This application is a continuation of pending U.S. application Ser. No. 13/664,172, which was filed on Oct. 30, 2012, and claims priority thereto.

BACKGROUND OF THE INVENTION

Common electrical sockets used for power distribution within structures such as homes and businesses have been used for efficient power transmission for decades. While efficient at power transfer, they have numerous shortcomings that are well known yet have never been addressed. The presence of a live uncovered or exposed conducting surface in today's sockets near the surface of the wall puts children at risk when they insert fingers or objects. If a power cord carrying power from the wall to an appliance is damaged, it creates a live wire outside of the wall, with similar (but greater) risks.

The danger of sockets requiring direct connection to transmit power can be addressed by creating resonance between an in-wall source and a wall surface sink, with the sink being connected to a power cable that supplies an appliance. This process is described in numerous U.S. patents and applications, including U.S. Pat. Nos. 8,115,448, 8,106,539, 8,097,983, 8,084,889, 8,076,801, 8,076,800, 8,035,255, 8,022,576, 7,825,543, and 7,741,734.

While the resonance method eliminates the danger of a live wire in a socket, it does not eliminate risk from damage to the cable, nor is it as efficient as it could be if the in-wall source is always on. What is needed, then, is a method for conveniently turning the power on only when a bonafide wall surface sink is connected, and for cutting it off in the event of damage to the cable.

SUMMARY OF THE INVENTION

In accordance with a first aspect of the disclosed subject matter, there is provided a method of controlling electrical power distribution to a socket, comprising the steps of generating a signal, transmitting the signal through the socket, causing the signal to be broadcast into the air, receiving the signal, and switching electrical power to the socket on when the signal is received. In accordance with a second aspect of the disclosed subject matter, there is provided an apparatus for distribution of electrical power to a socket, comprising a signal generator that generates a signal, a transmitter adjacent the socket, an antenna capable of broadcasting the signal, a router capable of detecting the signal when broadcast, and a controller capable of turning electrical power to the socket on or off in response to the signal detected by the router.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF PREFERRED EMBODIMENTS

For the purposes of this application, an "appliance" is any device that operates using mains power such as is typically found in homes and businesses.

A plug 10 and a socket 12 are so constructed as to mate with one another for the purposes of transmitting full power 24 capable of operating appliance 18. The precise shape of the plug 10 and socket 12 do not matter as long as they can be securely connected to one another mechanically. Preferably, a self-centering design is used to easily secure the plug 10 into the socket 12. The plug 10 and socket 12 are preferably designed to operate to transmit power 24 wirelessly from the socket 12 to the plug 10. This minimizes the chance of contact between humans or animals and a live wire. However, it is also possible to construct this system with conventional plugs as are already common in homes and business throughout the world.

Figure 1:
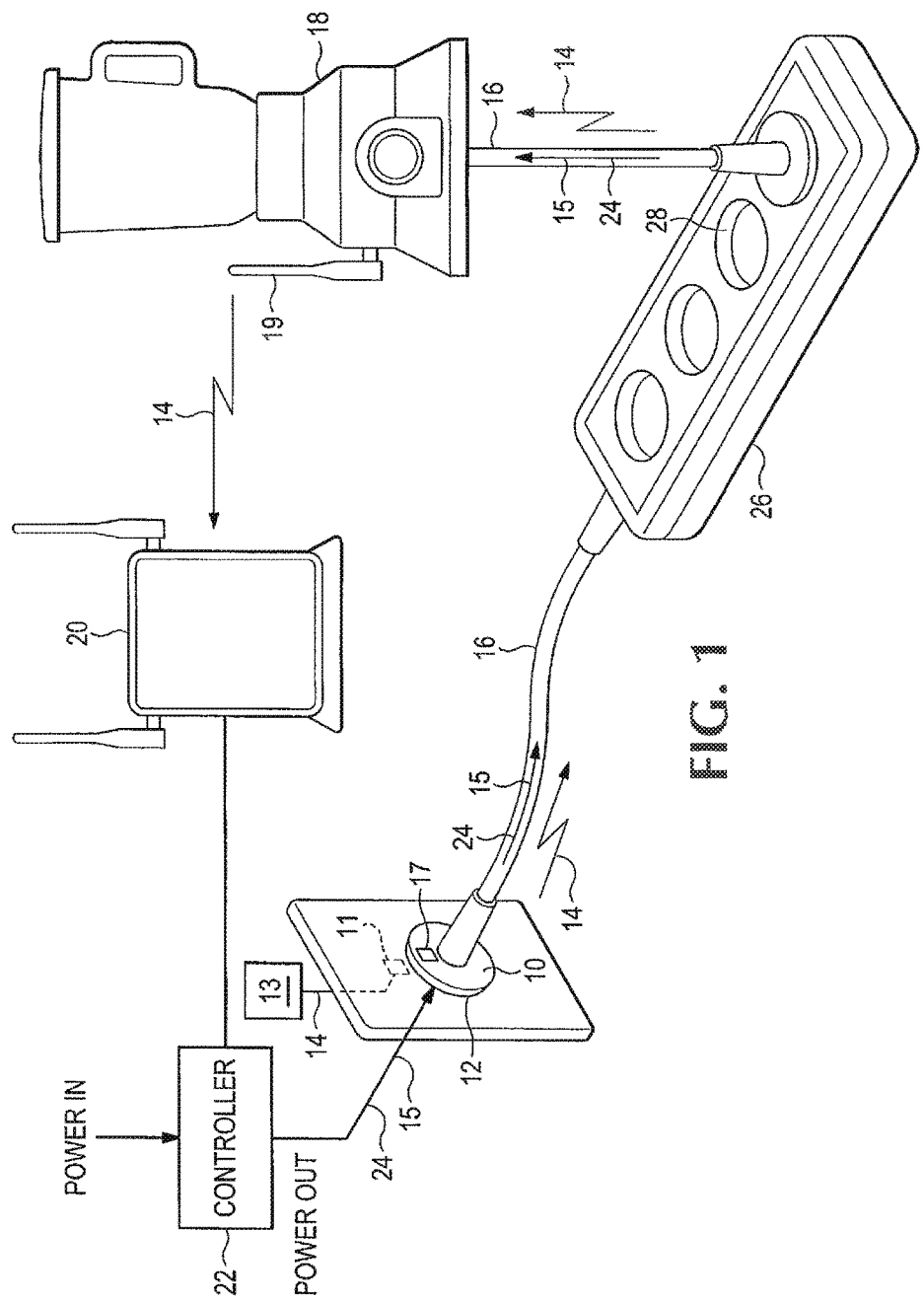
FIG. 1 is a schematic representation of one embodiment of the control system when proper connections have been made and power is flowing through the socket.

In one embodiment, shown in FIG. 1, a transmitter 11 located proximate the socket 12 transmits a radio frequency signal 14, generated by the signal generator 13, which uniquely identifies the particular socket 12 with which it is associated. The Signal 14 may be compatible with IEEE 802.11 standards to permit the use of readily available hardware for its generation. Along with signal 14, the socket 12 also constantly streams low power 15 sufficient to energize a few radio chips. Low power 15 is also preferably transmitted wirelessly from socket 12 to plug 10. The low power 15 is insufficient to operate appliance 18 and also preferably insufficient to harm humans or animals that may come in contact with it. The transmitter 11 is intentionally designed to have a poor impedance match with the air, so that relatively little of the signal 14 is able to leak out. However, a receiver 17 located in the plug 10, when placed the appropriate distance from the transmitter 11, has a good impedance match, and the plug 10 therefore receives the signal 14 and low power 15. The power cable 16 conveys the signal 14 and low power 15 to an appliance 18 with minimal loss. This may involve a dedicated waveguide, such as the familiar coaxial cable, or the signal 14 and low power 15 may be carried by the ordinary copper wires by which full power 24 to turn on the appliance 18 is transmitted, so that the power cable 16 will be of minimal size. The appliance 18 is provided with an antenna 19 that is so designed as to efficiently broadcast the signal 14. The antenna 19 may be outside the appliance 18 housing, or it may be inside the housing. Preferably, the appliance 18 has a power switch which acts not only to connect and disconnect the full power 24 provided by the plug 10 to the appliance 18, but also to connect and disconnect the signal 14 and low power 15 to the antenna 19.

Figure 2:
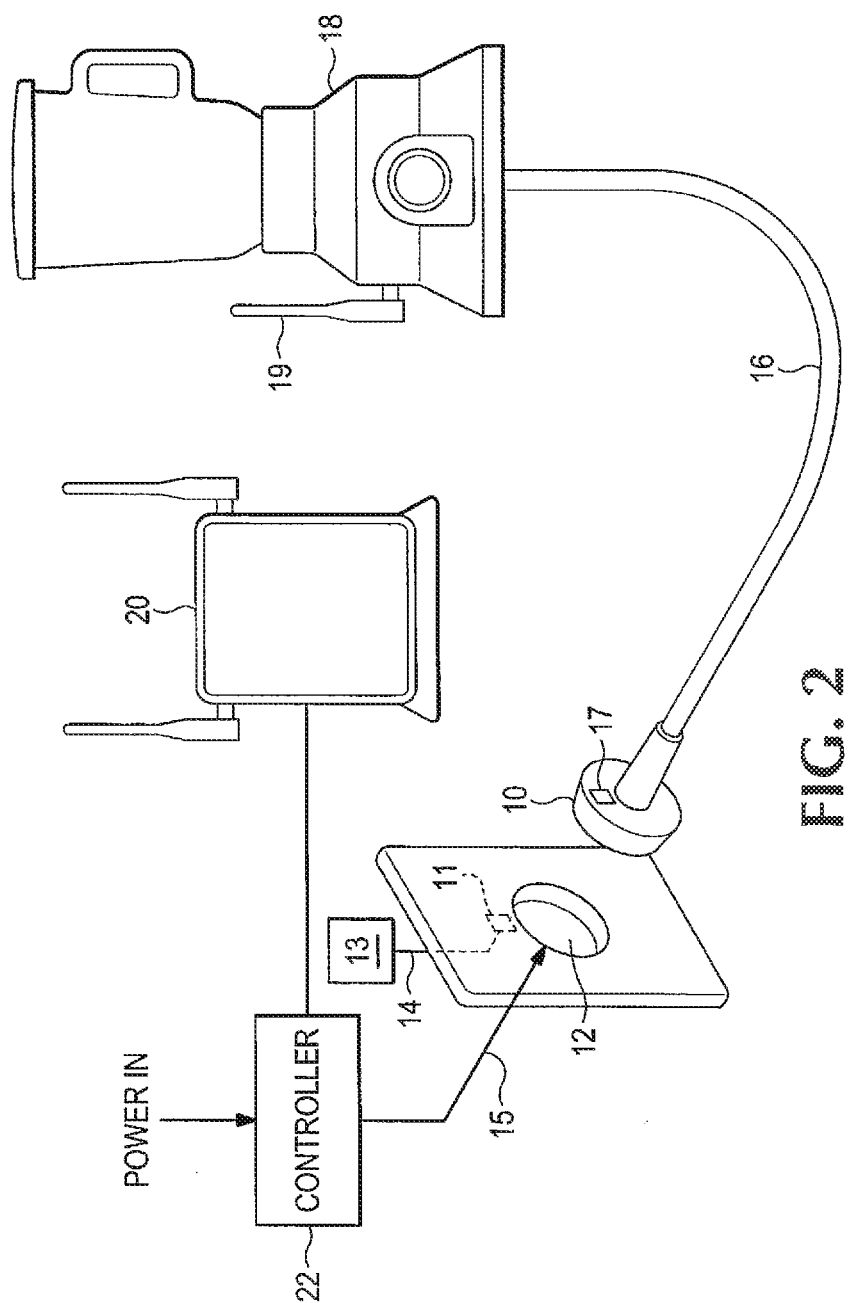
FIG. 2 is a schematic representation of one embodiment of the control system when power is not flowing through the socket.

When the plug 10 is in the socket 12 (FIG. 1) and the power switch on the appliance (if provided) is in the "on" position, the signal 14 carrying the socket 12 ID travels from the transmitter 11 to the receiver 17, down the power cable 16, and to the antenna 19. Low power 15 travels from socket 12 to plug 10 down the cable 16 to turn on the radio chip connected to antenna 19 in appliance 18. Signal 14 is broadcast into the air, and then received by a router 20, which communicates with a power controller 22. The controller 22 may control full power 24 to all sockets 12 in the house or office, or there may be a separate controller 22 for each individual socket 12. In either case, the sockets 12 are each subject to individual control. When the controller 22 receives the signal 14 identifying the socket 12, it turns on full power 24 (for example at 110V or greater as required for the operation of the appliance) to that socket 12 and that socket 12 only. Other sockets 12 remain unchanged. The controller 22 may use any well-known means, such as relays, to accomplish this. For as long as the router 20 continues to receive the signal 14, the controller 22 maintains power 24 to the socket 12. If the power switch on the appliance 18 (if provided) is turned off or the plug 10 pulled out of the socket 12 (FIG. 2), the connection between the transmitter 11 and the antenna 19 is broken. The broadcast of the signal 14 ceases and the controller 22 turns off full power 24 to the socket 12. In like fashion, if the cable 16 is cut or broken, the cable 16 ceases to convey the signal 14 to the antenna 19, with the same effect. Electrocution hazard is greatly reduced. There is never full power 24 to the socket 12 unless a bonfire appliance 18 that can complete the communication loop with the router 20 is plugged in, and unplugging or damaging the cable 16 cuts full power 24. (Low power 15 is still provided.) If the socket 12 is of the wireless type as is preferable, there are never live surfaces near the wall, either. In addition, there is no need for power switches to be capable of switching heavy loads within the appliance 18 because that can be handled by the system in the wall. This is of particular advantage for high-current inductive loads, such as those involving electric motors.

For certain appliances 18, the power switch would not be connected to the antenna 19. For instance, a laptop computer might need to charge its battery even when the computer is turned off. The antenna 19 in such a case would be continuously connected to the cable 16, regardless of the status of the power switch.

A power strip 26 or extension cord with multiple sockets 28 may contain a local controller that may assign a unique 10 to each of its sockets 28, as shown in FIG. 1. When such a power strip 26 is connected to the wall socket 12, it becomes necessary to transmit not only the ID of the wall socket 12 and low power 15, but also the ID of each power strip socket 28. The power strip 26 can use a fraction of the low power 15 transmitted from the wall socket 12 for each power strip socket 28. Each socket 28 carries low power 15 and a signal 14 bearing both the wall socket's 12 10 and a unique ID for each power strip socket 28. When an appliance 18 is connected to the power strip 26, its antenna 19 receives and transmits two identifiers: one for the wall socket 12, and one for the power strip socket 28. The controller 22 then energizes the appropriate wall socket 12, and at the same time transmits the power strip socket 28 10 through wall socket 12, where it is received by the power strip 26. The local controller then energizes only the power strip socket 28 whose ID is received from the wall socket 12. Multiple power strip sockets 28 are activated by the transmission of multiple IDs through the wall socket 12 in the same manner when appliances 18 are connected to those power strip sockets 28. Sockets in the power strip without a bonafide appliance 18 connected to them are not energized or activated.

Figure 3:
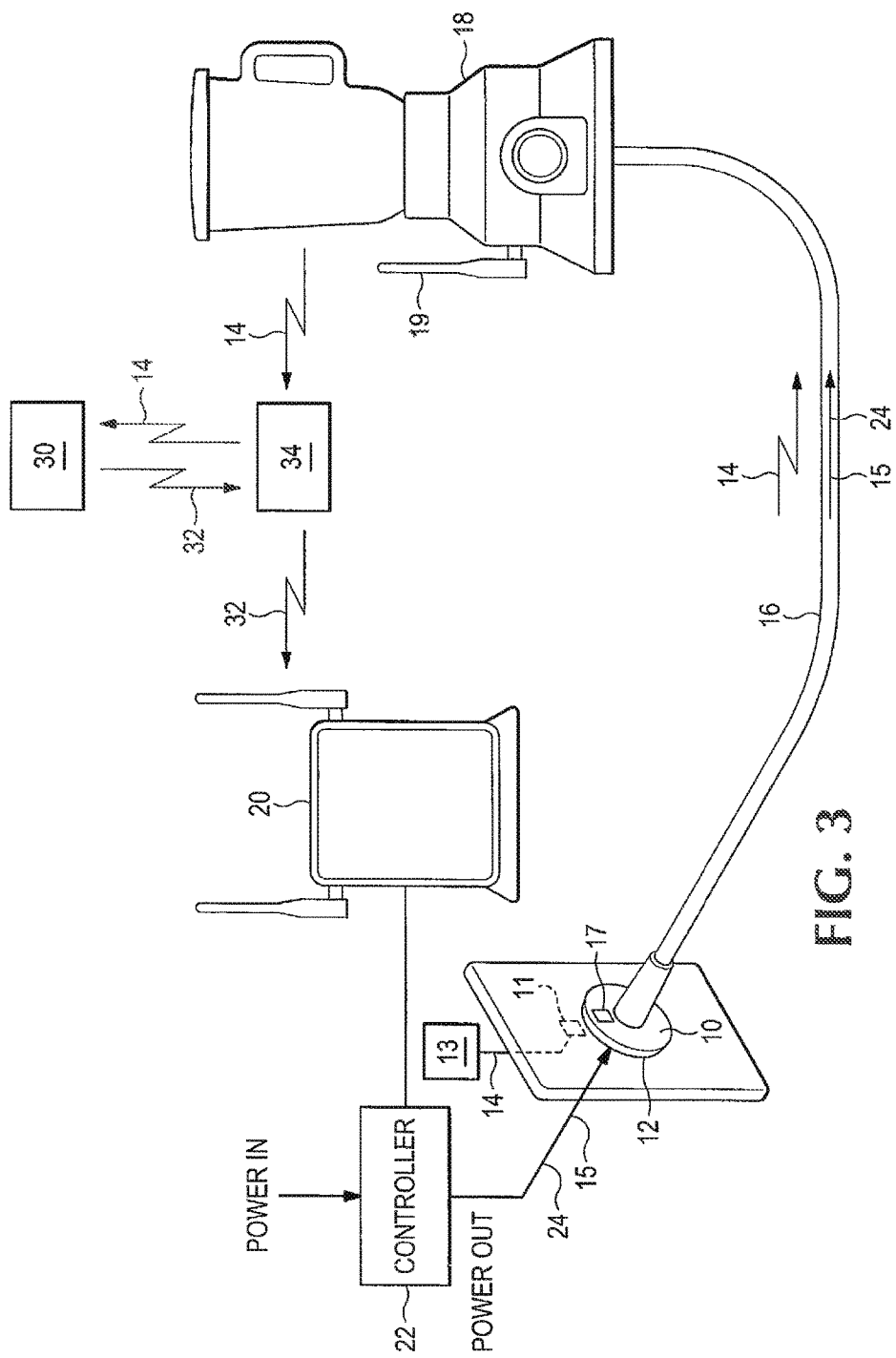
FIG. 3 is a schematic representation of an alternative embodiment of the control system featuring an external hub.

In an alternative embodiment shown in FIG. 3, the signal is not transmitted directly to the router 20. Rather, the appliance 18 communicates with the controller 22 through an external hub 30, such as a cell-phone system. In this embodiment, the appliance 18 does not send the signal 14 directly to the router 20. Rather, the appliance 18 sends the Signal 14 to the external hub 30, which then generates a message 32 to transmit to the router 20. The system may incorporate a gateway 34 capable of receiving a signal 14 and the message 32 and converting each of them to a new form of encoding, as is known in the art, so that the appliance 18 need not generate sufficient power by itself to reach the external hub 30, nor be compatible with all possible external hubs 30. In one embodiment, communications from the appliance 18 or router 20 to the gateway 34 are encoded based on IEEE 802.11, and communications between the gateway 34 and the external hub 30 are based on cellular telephone protocols. These protocols include but are not limited to IEEE 802.16 (known in the art by the trademark WIMAX), 3GPP Releases (including Release 8 and later, known in the art as LTE or "Long Term Evolution"), and standards promulgated by the International Telecommunications Union (including IMT-Advanced), and revisions thereof. These protocols are all well known in the art and are available to the public, and are hereby incorporated in their entirety by reference. Other protocols may also be employed, including those not yet described or even conceived. The message 32 may be passed through the gateway 34 if one is used, or it may be received directly by the router 20. Because of bandwidth limits, it may be desirable to generate an "on" message 32 and an "off" message 32 in response to the receipt or non-receipt of the signal 14 by the external hub 30, rather than transmitting the message 32 continuously as in the strictly local system described above. In addition to the advantages described above when a strictly local system is used, the use of the external hub 30 permits power 24 to individual sockets 12 to be controlled remotely. Thus, for instance, a user with a smartphone, tablet computer, or other internet-capable device could activate heating or air conditioning at home before leaving work, so that the temperature inside the house would be comfortable upon arrival. Alternatively, a computer could be programmed to activate lights, television, radio, and other devices in order to give the impression that a vacant house is occupied.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. A method of controlling electrical mains power to an electrical socket capable of powering an appliance having an associated member matingly receivable within the electrical socket, the method comprising the steps of:
   a) delivering a first amount of said mains electrical power to the electrical socket, the first amount insufficient to operate the appliance;
   a) receiving a signal at a controller associated with the socket and in response to the signal delivering a second amount of mains electrical power to the electrical socket, the second amount larger than the first amount and sufficient to operate the appliance; where
   c) the controller operates using energy provided from said first amount of mains electrical power.

2. A controller for delivering electrical mains power to an electrical socket capable of powering an appliance having an associated member matingly receivable within the electrical socket, the controller comprising a power input for receiving the mains electrical power and a power output for delivering the mains electrical power to the outlet, where the controller operates to switch the amount of mains electrical power to the outlet between a first amount insufficient to operate the appliance and a second amount sufficient to operate the appliance, and where the controller uses the first amount to receive a selectively transmitted signal indicating that the controller should deliver the second amount to the socket.

* * * * *